United States Patent
Cai et al.

(10) Patent No.: US 8,055,290 B1
(45) Date of Patent: Nov. 8, 2011

(54) METHOD TO REDUCE PUSH-TO-TALK CALL SETUP TIME

(75) Inventors: Zheng Cai, Fairfax, VA (US); Trinh Vu, Ashburn, VA (US)

(73) Assignee: Nextel Communications Inc., Reston, VA (US)

(*) Notice: Subject to any disclaimer, the term of this patent is extended or adjusted under 35 U.S.C. 154(b) by 930 days.

(21) Appl. No.: 11/678,531

(22) Filed: Feb. 23, 2007

(51) Int. Cl.
    *H04B 7/00* (2006.01)
(52) U.S. Cl. ........................................ 455/518
(58) Field of Classification Search ............... None
    See application file for complete search history.

(56) References Cited

U.S. PATENT DOCUMENTS

| | | | |
|---|---|---|---|
| 5,590,400 A * | 12/1996 | Lopponen | 455/509 |
| 6,501,737 B1 * | 12/2002 | Mathal et al. | 370/252 |
| 6,629,285 B1 * | 9/2003 | Gerendai et al. | 714/748 |
| 7,085,365 B2 * | 8/2006 | Kauppinen | 379/202.01 |
| 7,089,027 B1 * | 8/2006 | Welch et al. | 455/521 |
| 7,096,026 B2 * | 8/2006 | Thorson et al. | 455/450 |
| 7,200,139 B1 * | 4/2007 | Chu et al. | 370/352 |
| 7,206,595 B2 * | 4/2007 | Zufall | 455/519 |
| 2003/0211859 A1 * | 11/2003 | Chen et al. | 455/518 |
| 2004/0002351 A1 * | 1/2004 | Upp et al. | 455/519 |
| 2005/0124367 A1 * | 6/2005 | Hassan et al. | 455/518 |
| 2005/0266861 A1 * | 12/2005 | Rajkotia | 455/458 |
| 2006/0019681 A1 * | 1/2006 | Harris et al. | 455/464 |
| 2006/0084432 A1 * | 4/2006 | Balasubramanian et al. | 455/434 |
| 2006/0111134 A1 * | 5/2006 | Mills | 455/518 |
| 2006/0121888 A1 * | 6/2006 | Harris et al. | 455/414.1 |
| 2006/0233101 A1 * | 10/2006 | Luft et al. | 370/229 |
| 2007/0192439 A1 * | 8/2007 | Bhaskaran | 709/219 |
| 2008/0051098 A1 * | 2/2008 | Rao | 455/452.1 |

* cited by examiner

*Primary Examiner* — Yuwen Pan
*Assistant Examiner* — Ayodeji Ayotunde

(57) ABSTRACT

System and method for reducing call setup time of a dispatch communication. In one embodiment, a method includes receiving a message from an originating dispatch device intended for a target dispatch device. The message may be inspected by a base transceiver station for a call request announcement. The method may further include determining if a radio resource is available for the target dispatch device. According to an additional embodiment of the invention, a call request acknowledgement message may be transmitted to the originating dispatch device after a period of time to ensure a guaranteed talk permit. The call request announcement may also be transmitted to the target dispatch device after the period of time.

17 Claims, 3 Drawing Sheets

METHOD TO REDUCE PUSH-TO-TALK CALL SETUP TIME

FIELD OF THE INVENTION

The present invention relates generally to push-to-talk wireless communications systems and more particularly to systems and methods for reducing latency in push-to-talk call setup.

BACKGROUND

Wireless communications systems offer a variety of services to subscribers such as interconnect calling, short message service, packet data communications and dispatch communications. Many wireless communications systems facilitate communications between a wireless application server and a client application resident on the wireless subscriber unit. For example, dispatch services (also known as "push-to-talk" or "walkie-talkie" services) are currently offered as an Internet protocol (IP) application served by a dispatch server. Dispatch communication services are commonly implemented as a push-to-talk (PTT) type of service, such as the dispatch call service marketed by Sprint Nextel Corporation under the trade name Direct Connect or the dispatch communication service developed by Qualcomm under the trade name of QChat.

Current systems and methods for dispatch communications rely on a serial procedure for connection of a subscriber device to a target device. PTT communications are initiated by a subscriber first selecting a target subscriber, followed by pressing a so-called "PTT button" on their handheld device. Conventionally, call requests are sent to a base transceiver station and routed to a push-to-talk server which locates a target subscriber and routes the call request to a target BTS. Conventional methods and devices perform a serial operation for establishing a subscriber call, and require substantial setup times for initiating and connecting PTT devices resulting in significant latency time periods for call setup.

The use of activating a target mobile device to a ready state prior to initiating call setup has been suggested by U.S. Patent Application Publication No. 2006/0111134 to Mills. However, this approach requires calling a mobile station and to change to an operational state prior to initiating a call setup. Further this approach requires substantial processing prior to calling a mobile station and operates in a serial manner extending set up time.

Substantial setup times add to the latency of call setup, tie up resources and consume excess power. Thus, there is a need for a dispatch communication system and method for reducing call setup latency.

BRIEF SUMMARY OF THE INVENTION

Disclosed and claimed herein are systems and methods for reducing call setup time of a dispatch communication. In one embodiment, a method includes receiving a message from an originating dispatch device intended for a target dispatch device. The message may be inspected for a call request announcement. The method further includes determining if a radio resource is available for the target dispatch device. According to an additional embodiment of the invention, a call request acknowledgement message may be transmitted to the originating dispatch device prior to sending the call request announcement to a target dispatch device.

Other aspects, features, and techniques of the invention will be apparent to one skilled in the relevant art in view of the following detailed description of the invention.

DETAILED DESCRIPTION OF EXEMPLARY EMBODIMENTS

Figure 1:
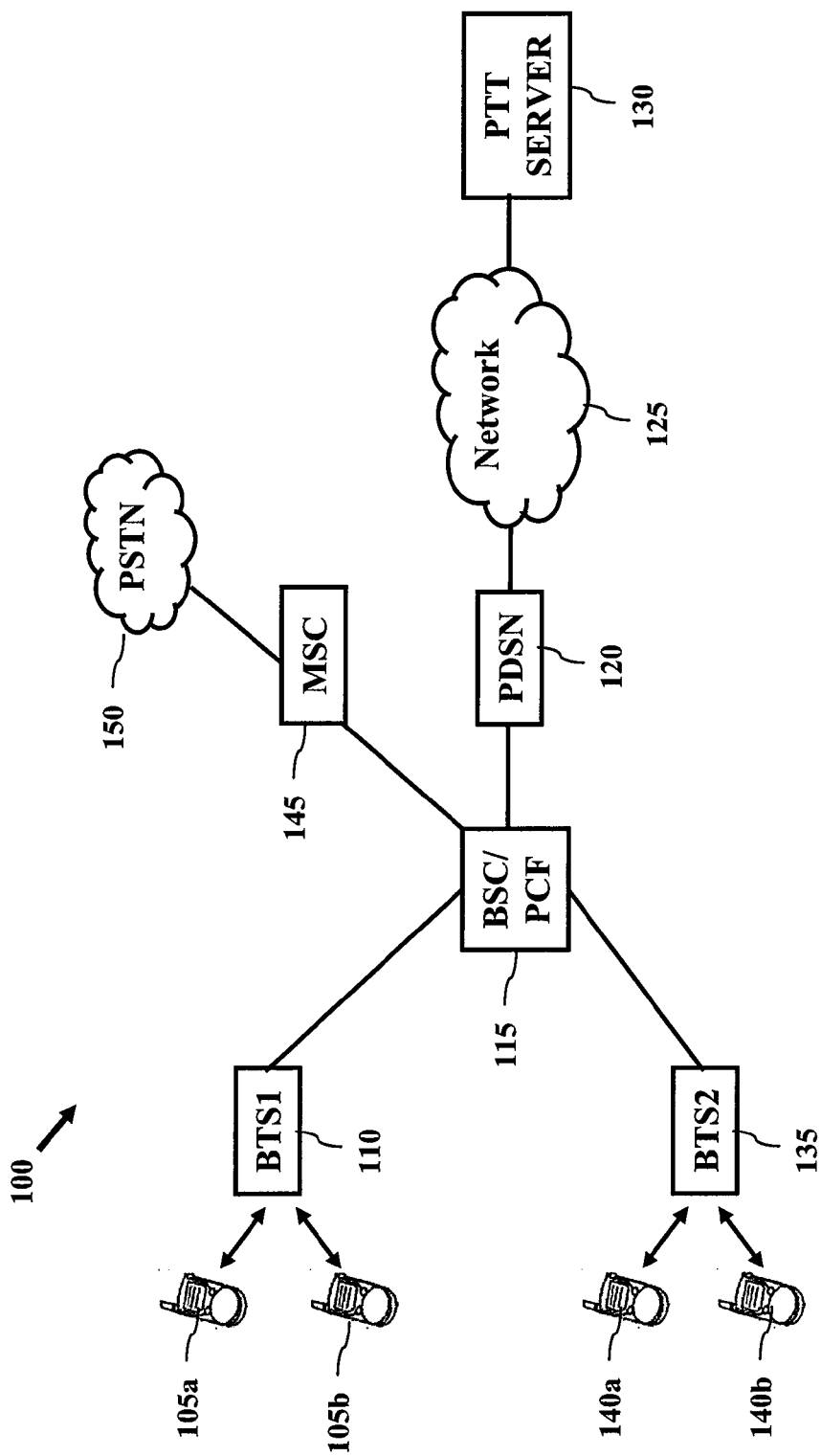
FIG. 1 depicts embodiments of simplified system diagram of one or more aspects of the invention.

One aspect of the present invention is to reduce call setup time of a dispatch communication. To that end, the present disclosure relates to the idea that a base transceiver station (BTS) is configured to send a call request acknowledgment message on behalf of a target device before such a device has actually received any notification of an incoming call request. This is in contrast to conventional systems in which the target device transmits the call request acknowledgment message back to an originating dispatch device. In one embodiment of the invention, this functionality is provided by configuring the BTS to perform a deep packet inspection on an incoming signal.

In one embodiment, a PTT call request is initiated by an end user on a dispatch device which may be received by a dispatch server. The dispatch server may generate a message containing a call request announcement for a target dispatch device. The message may then be received by a network interface such as a BTS that serves the target dispatch device. In one embodiment, the BTS may inspect the message for a call request announcement. If the received message contains a call request announcement, radio resource availability may be determined for the target dispatch device. In one embodiment of the invention, a call request acknowledgement message may be transmitted to the originating dispatch device after a period of time. The call request announcement may be sent to the target dispatch device after the call request acknowledgement has been transmitted.

In certain embodiments of the invention, call request announcement may be transmitted in the application layer of a dispatch communication network. According to an additional embodiment of the invention, inspecting the message for a call request announcement by a BTS may include performing a deep packet inspection to determine if the application layer of the message contains call request announcement. In a further embodiment of the invention, determining radio resource availability for the target dispatch device may include establishing a radio resource control connection for a target dispatch device. According to another embodiment of the invention, if a radio resource is available, a BTS associated with the target device may reserve the radio resource and page the target device. After a page response is received, the BTS may send the call request acknowledgement message to the originating dispatch device prior to transmitting the call request announcement to the target device. In one embodiment of the invention, the BTS may simultaneously determine if a period of time is required to hold the call request acknowledgement message and establish a traffic channel with the target device. According to another embodiment of the invention, the BTS will transmit the call request announcement to the target device once a traffic channel is established. The target device may reply with an acknowledgement message to the BTS.

According to a further embodiment of the invention, the aforementioned period of time may be determined based on traffic channel setup time for the target device and time required to transmit the call request acknowledgement message from a target base station transceiver to the originating dispatch device. In one embodiment, transmitting the call request acknowledgement message to the originating dispatch device and establishing a target dispatch device traffic channel may be performed in parallel, thereby reducing the latency in call setup time for the dispatch communication.

In one embodiment of the invention, the dispatch communication may be provided by one or more of a Code Division Multiple Access system, a Global System Mobile system, Universal Mobile Telecommunications system, a packet switched data system and a radio access system. Similarly, the dispatch communication may correspond to any PTT communication technology.

In another embodiment, a dispatch communication system is provided with improved call setup time. In one embodiment, the system may include a first dispatch device configured to communicate with a dispatch communication network. The system may also include a network interface configured to connect the dispatch communication network to a target dispatch device. According to another embodiment of the invention, the network interface may be configured to receive a message from the first dispatch device intended for the target dispatch device. The message may be inspected for a call request announcement and radio resource availability may be determined for the target dispatch device. According to another embodiment of the invention, a call request acknowledgement message may be transmitted to the originating dispatch device prior to sending the call request announcement to the target dispatch device and after a period of time. The period of hold time may be necessary to guaranty a talk permit when the time required to establish a traffic channel with the target device exceeds the transmission time of a call request acknowledgement message to the originating device.

According to another aspect of the invention, a computer program product is provided including a computer usable medium having computer executable program code embodied therein to setup a dispatch communication. In one embodiment of the invention, the computer program product may correspond to computer readable program code to receive a message from an originating dispatch device intended for a target dispatch device, computer readable program code to inspect the message for a call request announcement, and computer readable program code to determine if a radio resource is available for the target dispatch device. The computer readable program code may include transmitting a call request acknowledgement message to the originating dispatch device prior to transmitting the call request announcement the target dispatch device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

FIG. 1 illustrates a block diagram of an exemplary communication system 100 in which one or more aspects of the invention may be implemented. In one embodiment, the communication system 100 serves a plurality of subscriber units 105*a*-*b* and 140*a*-*b*, which may communicate with corresponding local base transceiver stations 110 and 135. In one embodiment, the base transceiver stations 110 and 135 use code division multiple access (CDMA) based RF protocol to communicate with the subscriber units 105*a*-*b* and 140*a*-*b*. The subscriber units 105*a*-*b* and 140*a*-*b* may be an end-user interface to the communication system 100. It should be appreciated that subscriber units 105*a*-*b* and 140*a*-*b*, may also be referred to as dispatch devices and may be comprised of phones, pagers, modems, mobile transceivers, end-user base transceivers, or similar cellular-capable devices. Subscriber units 105*a*-*b* and 140*a*-*b* may be capable of dispatch calling, interconnect calling, roaming, message mail and/or data communications.

Base transceiver stations 110 and 135 may provide full-duplex voice service and may allow users to transmit circuit switch/packet data with each other (or with external entities). Subscriber units may communicate to external devices via a mobile switching center 145 and a public switched telephone network 150. The details of which are beyond the scope of this disclosure. Base transceiver stations 110 and 135 may be comprised of base station radios and control equipment.

In the case of dispatch calling, base transceiver stations 110 and 135 may provide half-duplex voice service, thereby allowing users to communicate with each other (or with external entities) by way of half-duplex voice. Such cell sites may be used to provide the RF link between the carrier network and the various dispatch devices 105*a*-*b* and 140*a*-*b*. The network 125 may comprise the Internet, a wide area network (WAN), a local area network (LAN), an intranet, or other type of packet-switch network.

Communication system 100 may further include a packet data serving node (PDSN) 120, which may provide a connection point between the radio access and IP networks. In one embodiment, PDSN 120 may also be responsible for managing point-to-point protocol (PPP) sessions between a carrier's core internet protocol (IP) network and the dispatch devices 105a-b and 140a-b.

As depicted in FIG. 1, communication system 100 may further include a PTT server 130. In one embodiment, the PTT server 130 may coordinate and control packet data and dispatch services. Moreover, the PTT server 130 may provide first-time registration for dispatch subscribers, as well as maintenance and tracking of subscriber mobility for dispatch and packet data.

In contrast to interconnect voice communication services, dispatch communication services are typically implemented in a proprietary manner, which prevents dispatch calls from originating in one wireless carrier's network and terminating in another wireless carrier's network. Additionally, voice dispatch communication services are typically implemented only in wireless communication networks. For example, dispatch communication signalling can be provided using session initiation protocol (SIP) and media can be transported using real-time protocol (RTP), both of which can be carried in Internet Protocol (IP) packets.

As used herein, the term "dispatch communication" or "dispatch call" refers generically to any PTT service, including High-performance PTT (HPPTT), PTT over Cellular (PoC) and Dispatch to Desktop (D2D), etc.

Figure 2:
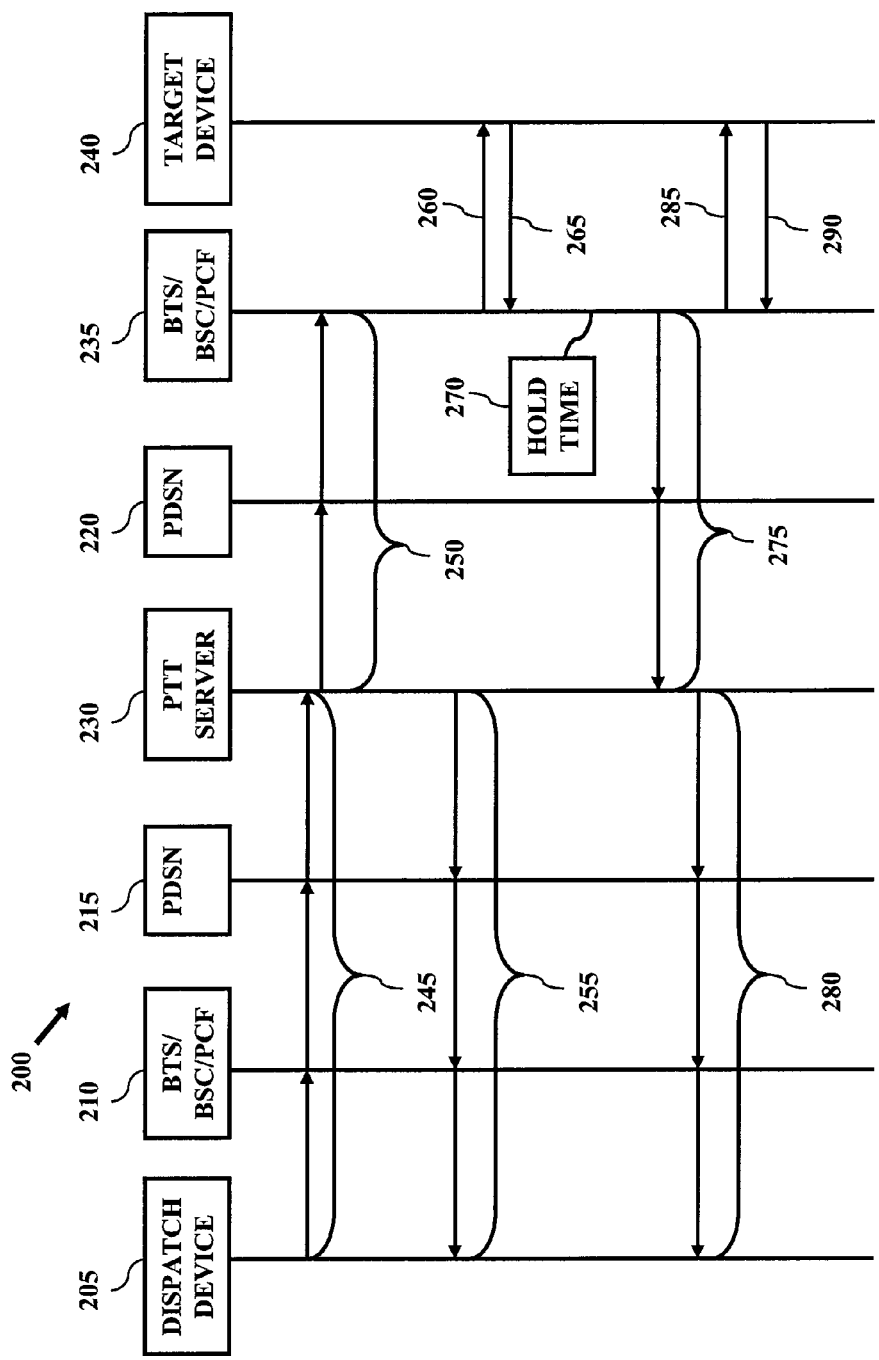
FIG. 2 illustrates a call setup procedure of a dispatch communication system capable of carrying out one or more aspects of the invention.

FIG. 2 illustrates call setup procedure 200 in which one or more aspects of the invention may be implemented. In one embodiment, an end user dispatch device 205, (e.g., subscriber unit 105a) may initiate a PTT call request 245 intended for a target dispatch device 240. The call request 245 may be transmitted to a PDSN 215 via one or more of a base transceiver station, base station controller and packet control function (BTS/BSC/PCF) 210. The call request 245 may then be transmitted from PDSN 215 to PTT server 230. According to one embodiment of the invention, PTT server 230 may then locate the target dispatch device 240, generate message 250 to target BTS/BSC/PCF 235 associated with target dispatch device 240 via PDSN 220. A BTS associated with the target dispatch device 240 may perform a deep packet inspection on message 250 to determine if the application layer contains a call request announcement, according to another embodiment of the invention. If the BTS (e.g., BTS2 135) locates a call request announcement, the BTS may also determine if the target dispatch device 240 is available with a general page 260. The target dispatch device 240 may respond to the general page 260 with a page response 265. The BTS may then allocate a radio resource for the target device by arranging a traffic channel. According to another embodiment of the invention, the BTS may hold for a period of time 270. The BTS may then send a call announce acknowledgement message 275 to the PTT server 230 and PTT server 230 may then send floor grant message 280 to the originating end user dispatch device 205. The BTS may send the call request announcement 285 to the target dispatch device 240 once a traffic channel is established. Call request acknowledgment message 290 may be sent from target dispatch device 240 to target the BTS (e.g., BTS2 135) acknowledging the call request announcement 245. Dispatch communication may then commence between the end user dispatch device 205 and target dispatch device 240.

In a further embodiment of the invention, hold time 270 may be based at least in part on traffic channel setup time for the target device and time required to transmit the call request acknowledgement message from a target base station transceiver to the originating dispatch device. One example, not limiting the entire invention, would be to assign a variable X for time related to sending the call request acknowledgement message from the target BTS to the originating device. A variable Y may be assigned for time related to establishing a traffic channel for the target device and time related to ready the target device. The period of hold time H may then be determined as H=Y−X, according to one embodiment of the invention. If H>0, then target BTS may wait a period of hold time H (e.g., 270) prior to sending a call request acknowledgement message to the originating device in order to ensure a guaranteed talk permit. That is, when the originating device generates a talk permit tone to the end user, the target device has accepted the announcement message.

Figure 3:
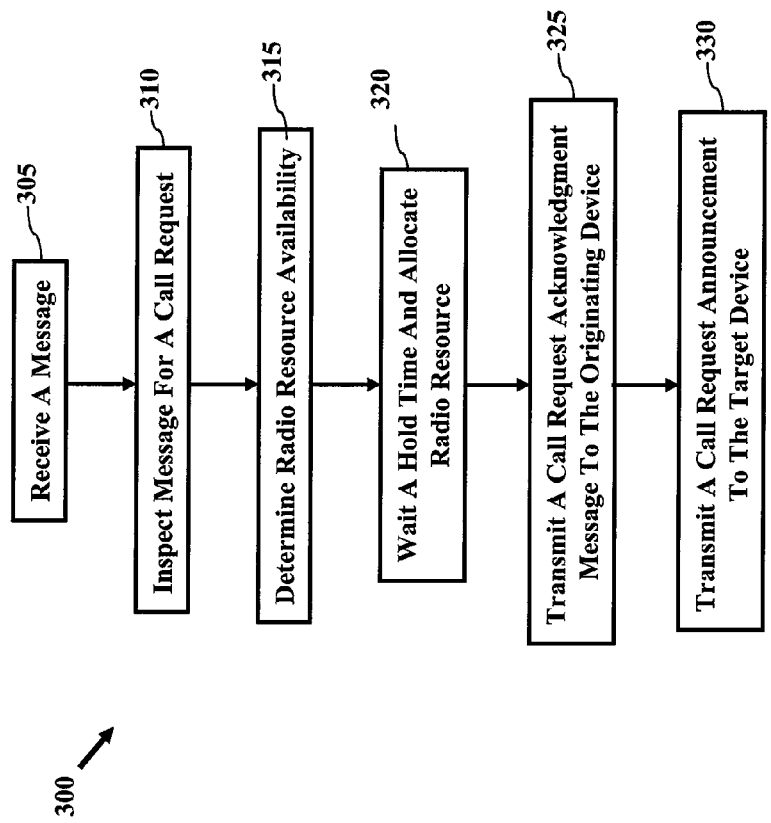
FIG. 3 illustrates a call setup procedure of a dispatch communication system capable of carrying out one or more aspects of the invention.

FIG. 3 illustrates a process 300 for reducing call setup time of a dispatch communication in which one or more aspects of the invention may be implemented. In one embodiment of the invention, process 300 is initiated with block 305 wherein a message is received. The message may be sent from an originating dispatch device (e.g., 105a) intended for a target dispatch device (e.g., 140a). In process block 310, the message may be inspected for a call request announcement. According to a further embodiment of the invention, process 300 may continue with determining if a radio resource is available for the target dispatch device as in block 315 and waiting a period time 320. Process block 320 may also include allocating a radio resource. In one embodiment of the invention, allocating a radio resource may include establishing a traffic channel with a target dispatch device. According to yet another embodiment of the invention, process 300 may provide for transmitting a call request acknowledgement message to the originating dispatch device in block 325 and transmitting the call request announcement to the target dispatch device in block 330. According to an additional embodiment of the invention, block 320 and block 335 may be performed as a parallel process to provide reduced call setup time. In certain embodiments, the parallel process may include performing block 325 and block 330 simultaneously, overlapping in time or within a predetermined period of time (e.g., milliseconds).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method to reduce call setup time of a dispatch communication comprising:
    receiving a message from an originating dispatch device intended for a target dispatch device;
    inspecting, by a base station servicing the target dispatch device, the message for a call request announcement;
    determining if a radio resource is available for the target dispatch device;
    transmitting from the base station servicing the target dispatch device a call request acknowledgement message to the originating dispatch device after the base station servicing the target dispatch device holds for a period of time based on a traffic channel setup time for the target dispatch device and a time required to transmit the call request acknowledgement message; and sending the call request announcement to the target dispatch device as a parallel process with said transmitting the call request acknowledgement message.

2. The method of claim 1, wherein the call request announcement is transmitted via an application layer of a dispatch communication network.

3. The method of claim 1, further comprising allocating the radio resource for the target dispatch device.

4. The method of claim 3, wherein said allocating the radio resource comprises establishing a traffic channel to the target dispatch device.

5. The method of claim 1, wherein said inspecting the message for a call request announcement further comprises performing a deep packet inspection to determine if an application layer contains a call request announcement.

6. The method of claim 1, wherein the dispatch communication is provided by one or more of a Code Division Multiple Access system, a Global System Mobile system, Universal Mobile Telecommunications system, a packet switched data system and a radio access system.

7. A dispatch communication system with improved call setup time comprising:
   a first dispatch device configured to communicate with a dispatch communication network; and
   a base station transceiver network interface configured to connect the dispatch communication network to a target dispatch device, wherein said network interface is configured to:
   receive a message from the first dispatch device intended for the target dispatch device;
   inspect the message for a call request announcement;
   determine if a radio resource is available for the target dispatch device;
   transmit a call request acknowledgement message to the first dispatch device after holding for a period of time based on a traffic channel setup time for the target dispatch device and a time required to transmit the call request acknowledgement message; and
   send the call request announcement to the target dispatch device as a parallel process with said transmitting the call request acknowledgement message.

8. The communication system of claim 7, wherein the base station transceiver is further configured to transmit the call request announcement via an application layer of the dispatch communication network.

9. The communication system of claim 7, wherein the base station transceiver is further configured to allocate the radio resource for the target dispatch device.

10. The communication system of claim 9, wherein said allocating the radio resource comprises establishing a traffic channel to the target dispatch device.

11. The communication system of claim 9, wherein inspecting the message for a call request announcement further comprises performing a deep packet inspection to determine if an application layer contains a call request announcement.

12. The communication system of claim 7, wherein said inspecting the message for a call request announcement further comprises performing a deep packet inspection to determine if an application layer message contains a call request announcement.

13. The communication system of claim 7, wherein the dispatch communication network is one of a Code Division Multiple Access network, a Global System Mobile network, Universal Mobile Telecommunications network, a packet switched data network and a radio access network.

14. A computer program product stored in a non-transitory processor readable medium comprising:
   a computer usable medium having computer executable program code embodied therein to setup a dispatch communication, the computer program product having:
   computer readable program code to receive a message from an originating dispatch device intended for a target dispatch device;
   computer readable program code to inspect, by a base station servicing the target dispatch device, the message for a call request announcement;
   computer readable program code to determine if a radio resource is available for the target dispatch device; computer readable program code to transmit from the base station servicing the target dispatch device a call request acknowledgement message to the originating dispatch device after the base station servicing the target dispatch device holds for a period of time based on a traffic channel setup time for the target dispatch device and a time required to transmit the call request acknowledgement message; and
   computer readable program code to allocate the radio resource for the target dispatch device, wherein said transmitting and said allocating are performed in parallel.

15. The computer program product of claim 14, further comprising computer readable program code to transmit the call request announcement via an application layer of a dispatch communication network.

16. The computer program product of claim 14, wherein said inspecting the message for a call request announcement further comprises computer readable program code to perform a deep packet inspection to determine if an application layer message contains a call request announcement.

17. The computer program product of claim 14, wherein the dispatch communication is provided by one or more of a Code Division Multiple Access system, a Global System Mobile system, Universal Mobile Telecommunications system, a packet switched data system and a radio access system.

* * * * *